United States Patent
Alkire et al.

(10) Patent No.: US 6,341,579 B1
(45) Date of Patent: Jan. 29, 2002

(54) LITTER BOX FILTER SYSTEM

(76) Inventors: William E. Alkire, 1107 W. Myrna La., Tempe, AZ (US) 85284; David B. Benz, 10255 N. 124 St., Scottsdale, AZ (US) 85259; Shawna M. Swenson, 1443 E. El Parque Dr., Tempe, AZ (US) 85282

( * ) Notice: Subject to any disclaimer, the term of this patent is extended or adjusted under 35 U.S.C. 154(b) by 0 days.

(21) Appl. No.: 09/627,385

(22) Filed: Jul. 28, 2000

Related U.S. Application Data

(63) Continuation-in-part of application No. 09/074,145, filed on May 7, 1998, now Pat. No. 6,123,048.

(51) Int. Cl.[7] .............................................. A01K 29/00
(52) U.S. Cl. ........................ 119/165; 119/419; 119/493; 119/500
(58) Field of Search ................................. 119/500, 163, 119/165, 161, 166, 418, 419, 493; 454/187, 207, 208, 242, 243, 250

(56) References Cited

U.S. PATENT DOCUMENTS

| | | | |
|---|---|---|---|
| 3,304,913 A | * | 2/1967 | Nesher |
| 3,537,428 A | * | 11/1970 | Montgomery |
| 4,095,559 A | | 6/1978 | Griffith |
| 4,343,261 A | * | 8/1982 | Thomas ...................... 119/418 |
| 5,044,325 A | * | 9/1991 | Miksitz ........................ 119/165 |
| 5,134,972 A | | 8/1992 | Compagnucci |
| 5,134,973 A | | 8/1992 | Sarullo |
| 5,140,948 A | | 8/1992 | Roberts |
| 5,289,800 A | | 3/1994 | Walton |
| 5,307,761 A | | 5/1994 | Berger, III et al. |
| 5,315,964 A | | 5/1994 | Mimms et al. |
| 5,511,513 A | | 4/1996 | Baron et al. |
| 5,564,364 A | | 10/1996 | Kovacs et al. |
| 5,636,594 A | | 6/1997 | Pina |
| 5,655,478 A | | 8/1997 | Kiera |
| 5,738,040 A | | 4/1998 | Simmons |
| 5,853,445 A | | 12/1998 | Wong et al. |
| 5,924,384 A | * | 7/1999 | Deitrich et al. |
| 6,041,741 A | * | 3/2000 | Gabriel et al. |
| 6,227,147 B1 | * | 5/2001 | Ball ........................... 119/484 |

* cited by examiner

Primary Examiner—Charles T. Jordan
Assistant Examiner—Yvonne R. Abbott
(74) Attorney, Agent, or Firm—Franklin Gubernick

(57) ABSTRACT

An exhaust and deodorizing system for an animal housing. The system features an exhaust unit provided with an air inlet operatively-connected to the interior of the animal housing. The exhaust unit further includes a replaceable filter, an air outlet and an electric fan. The fan is capable of moving a current of air from the inlet, through the filter, and then to the ambient area via the outlet.

An important feature of the invention is a flexible mat that conforms to, and seals, the top of the animal housing. The mat includes a hole that can be placed in at least partial registration with a ventilation hole in the housing. The exhaust unit's inlet fits in, or on, the hole in the mat. It should be noted that exact registration between the exhaust unit's inlet and the ventilation hole in the housing's roof is not required.

16 Claims, 5 Drawing Sheets

LITTER BOX FILTER SYSTEM

This application is a Continuation-In-Part of application 09/074,145 filed May 7,1998 now U.S. Pat. No. 6,123,048.

FIELD OF THE INVENTION

The invention relates to an exhaust and deodorizing system for an animal housing. More specifically, the invention is a kit that can be added to an existing passively-ventilated animal housing and thereby enable active ventilation of said housing and deodorization of the air exhausted from said housing. In the preferred embodiment, the invention is employed on an enclosed litter box for a cat.

BACKGROUND OF THE INVENTION

The need to control unpleasant odors that emanate from an animal housing, such as an enclosed litter box for a cat, has inspired a wide array of inventions. Today, animal odor control devices for animal housings are well known and exist in many forms and varieties. Walton, in U.S. Pat. No. 5,289,800, discloses a passive ventilation system. Warm air is deodorized by a charcoal filter as it rises from the animal housing and passes through the filter in the housing's roof. Griffith, in U.S. Pat. No. 4,095,559 discloses an active ventilation system. Air in the animal housing is vented away from the housing by an electric fan connected to a tubular exhaust conduit. The Griffith patent, as well as Miksitz, U.S. Pat. No. 5,044,325, and Roberts, U.S. Pat. No. 5,140,948 disclose odor control devices that are permanently fixed to the animal housing.

The previously described designs are all limited by the fact that each is specific to a specially designed and adapted animal housing. For an owner of a typical, passively-vented animal housing, there is no system that he or she can employ that is designed to modify such a housing to provide it with forced ventilation/odor control capabilities.

SUMMARY OF THE INVENTION

The invention is an active exhaust and deodorizing system for an animal housing. An electrically-powered fan is employed to draw air from within the housing. The removed air is then filtered and/or deodorized and/or scented before being exhausted into the ambient environment. In the preferred embodiment, the invention is capable of converting a basic, passively-ventilated housing, such as an enclosed litter box for a cat, or a habitat for a rodent, into a housing that is actively ventilated.

The system is designed to be placed atop a basic animal housing and make use of either an existing or added ventilation hole in the roof of the housing. Air from the interior of the housing passes through the ventilation hole and is then drawn through an air intake of an add-on exhaust unit that houses a fan. The air than passes through a removable, disposable filter and/or passes over a fragrance bar before exiting the unit via an air exhaust port. An optional air de-ionizer may also be included in the exhaust unit. The de-ionizer would be at least partially located in the air's flow path.

In addition to the exhaust unit that contains the fan, the system includes an adapter/sealing member in the form of a flexible mat or membrane. The mat includes an opening for the exhaust unit's air intake and is designed to overlie a significant portion of the roof of the animal housing. The mat is placed on the roof of the housing and then functions to create a substantially airtight seal between the exhaust unit's air intake and the interior of the animal housing. The mat's flexibility enables it to conform to the surface contour of almost any roof in a airtight manner. At the same time, the mat can also seal any underlying roof-located ventilation holes in the animal housing that are not in registration with the exhaust unit's air intake. The mat is preferably made of a polyurethane plastic material.

One object and feature of the invention is that exact registration of the air intake and the ventilation hole in the animal housing's roof is not required. Since the flexible mat includes a cut-out of the appropriate size for the exhaust unit's air intake, any portion of the ventilation hole outside the perimeter of the cut-out and underlying the mat is effectively sealed by the mat.

Another object and feature of the invention, as previously noted, is the ability of the mat to seal unneeded ventilation holes in the animal housing's roof. In this manner, even animal housings that feature dispersed top-located ventilation holes may be efficiently and effectively adapted by the invention.

It is a further feature of a first embodiment of the invention that the entire system need not be permanently attached to the housing. The system can be placed atop the housing's roof to thereby cover the housing's ventilation hole(s) and make a substantially airtight seal with the roof without resorting to glues, nails or caulking. In a second embodiment of the invention, the system's flexible mat can be permanently secured to the housing's roof using an adhesive to thereby create an airtight seal while completely and permanently sealing any unneeded holes in the portion of the housing's roof covered by the mat. In said second embodiment, the exhaust unit can preferably be separated from the flexible mat.

There may also be provided in the kit a sensing means operably connected to the electric fan for detecting the presence of an animal in the housing. The sensing means activates the electric fan when an animal is present in the housing and deactivates the fan when the animal leaves the housing.

BRIEF DESCRIPTION OF THE DRAWINGS

Turning now to the drawings in which presently preferred embodiments of the invention are depicted.

DETAILED DESCRIPTION OF THE DRAWINGS

Figure 1:
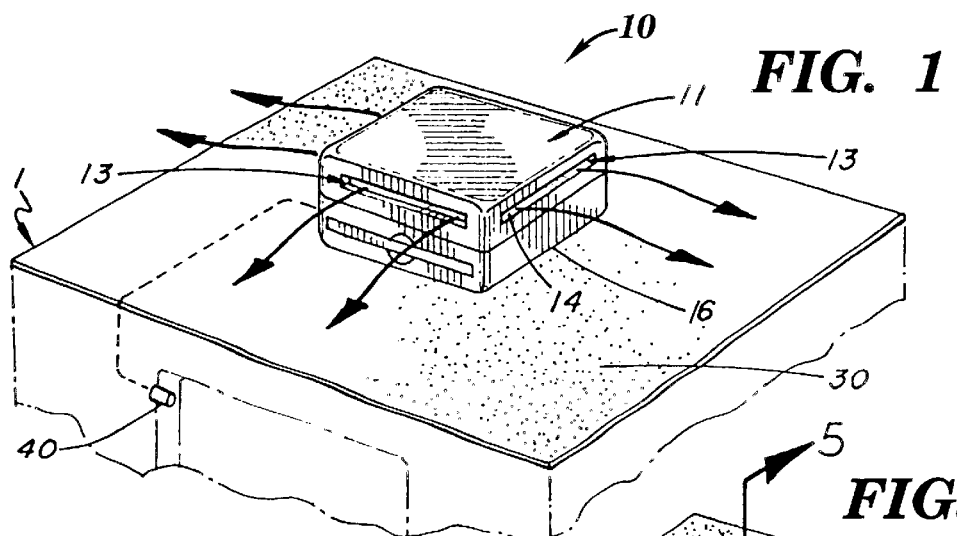
FIG. 1 is a view of a first embodiment of an exhaust unit of the invention, sealed to the roof of the housing by means of a first embodiment of a mat of the invention.
Figure 2:
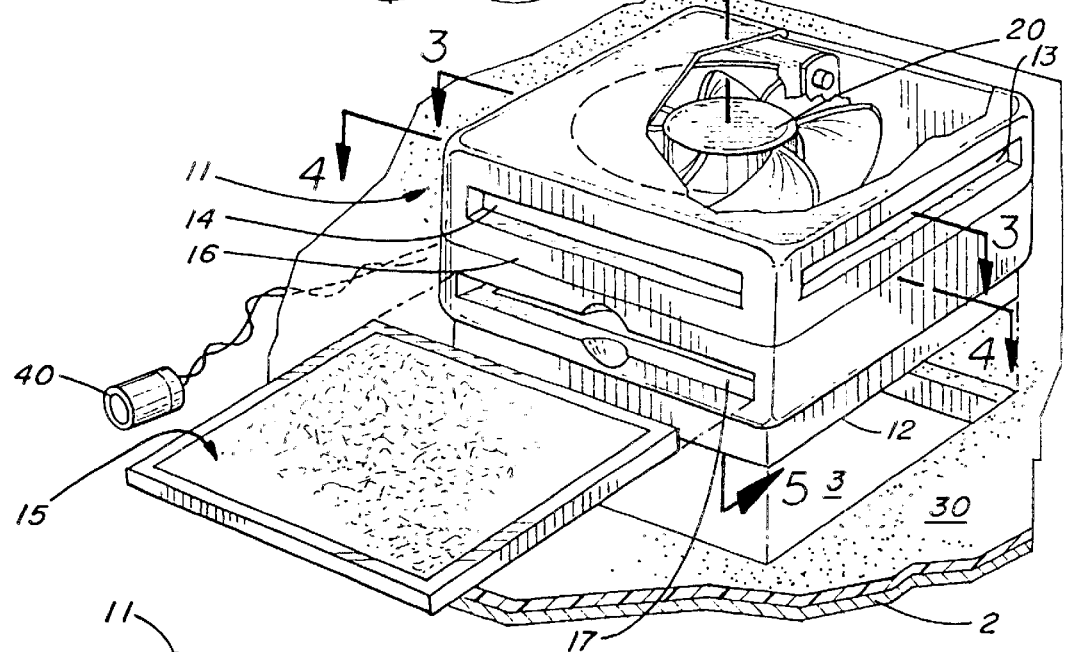
FIG. 2 is an enlarged view of a portion of the view of FIG. 1 showing one embodiment of the filter and filter retention means.
Figure 3:
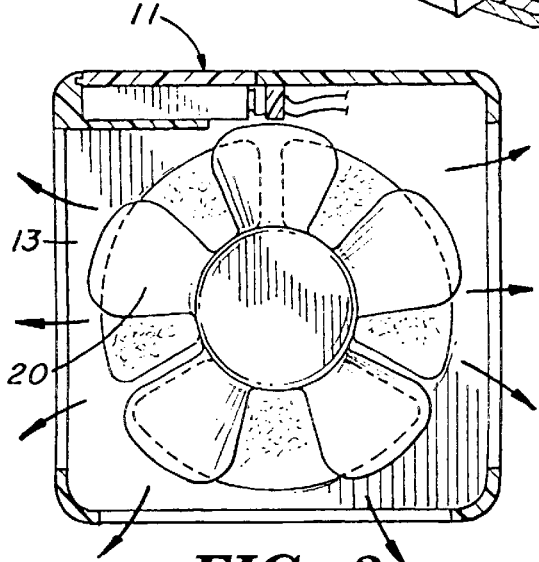
FIG. 3 is a sectioned view of the enclosure of FIG. 2 taken along the line 3—3.
Figure 4:
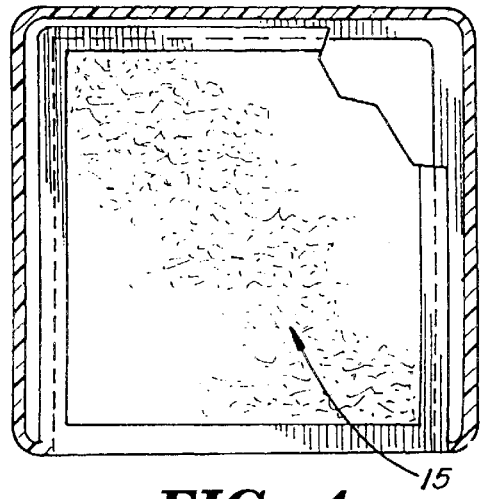
FIG. 4 is a sectioned view of the enclosure of FIG. 2 taken along the line 4—4, and showing the unit with the filter installed.
Figure 5:
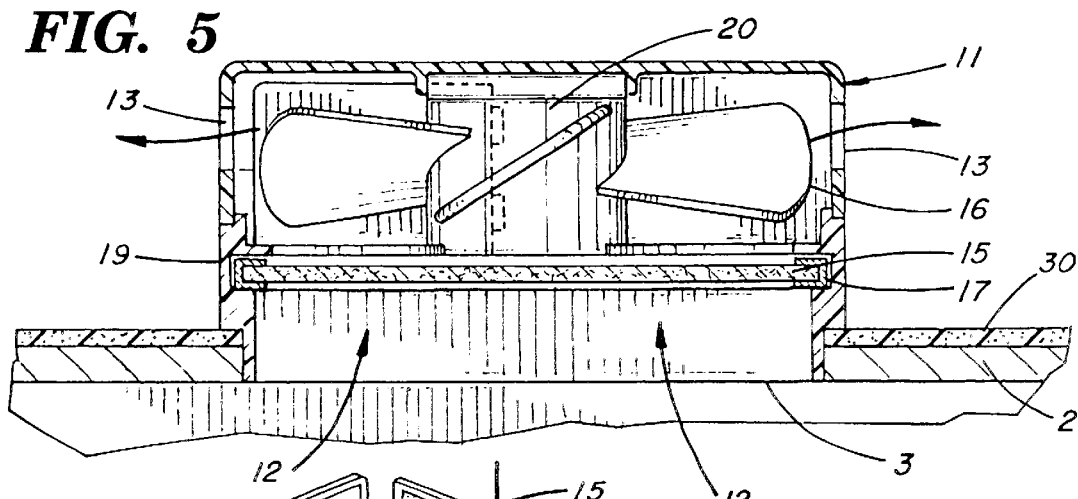
FIG. 5 is a sectioned view of the enclosure of FIG. 2 taken along the line 5—5, and showing the unit with the filer installed.

Referring now to the drawings in greater detail, wherein like numbers refer to like parts throughout the several figures, there is shown by the numeral 10 an animal habitation exhaust and deodorizing system in accordance with the invention. The system 10 is designed to be added to an animal habitation, and thereby improve the habitation's ventilation and odor characteristics.

The drawings illustrate preferred embodiments of the invention. In an exemplary use, the system is used to ventilate and deodorize an animal habitation 1, in the form of an enclosed litter box for a cat. Although the example chosen is the improvement of a habitation for cats, the invention may be used to ventilate/deodorize the habitation structures of other types of animals.

The habitation 1 features a roof 2 having a ventilation hole 3. If no hole 3 exists, one may be created in the habitation with little difficulty. In this manner, the system 10 can be employed to retrofit any of the animal habitations known to be presently on the market.

As seen in FIG. 1, the system 10 features an add-on exhaust unit 11 (also herein known as a fan housing and/or exhaust system) provided with an air inlet 12 and an air outlet 13. The outlet 13, as shown in FIG. 1, takes the form of apertures 14 in the walls 16 of the unit 11. Within the unit 11 there is an electric fan 20, here a hub motor fan, positioned to move a current of air from the inlet 12 through a filter 15 which may be of any suitable material, preferably activated charcoal, and out of the unit 11 via apertures 14.

One preferred embodiment of the electric fan 20 is a tube axial AC fan with an air flow of 30 CFM. The Sunon company makes a 3.15", 115 VAC, 60 Hz, 30 CFM, tube axial AC fan, model no. SF11580A, which can be used for the electric fan 20. Another preferred embodiment of the electric fan 20 is a DC fan. Use of a DC fan enables the device to run on battery power or with a suitable electrical adapter. The Sunon company makes a 3.15", 12 VDC, 36 CFM, brushless DC fan, model number KDE1208PTS1-6, that can be used for the electric fan 20. Either of these two fans will move a current of air sufficient to ventilate/deodorize a typical enclosed cat litter box such as habitation 1. However, due to the variety of sizes of animal housings available, electric fans 20 of different sizes and air flow capacities can be employed to circulate a current of air to deodorize those housings.

A horizontal slot 17, with guide rails 19, is provided in the walls 16 of unit 11 for removably receiving the filter 15. If more than one filter or type of filter is desired, provision may be made for a second filter in the size of the slots 17 or by making a second slot 17 (not shown). There is a wide variety of commercially available air filters for cat litter boxes which can be used to make the filter 15. One product which can be used to make a filter 15 is the Zeolite Air Filter produced by VanNess of Clifton, N.J.

An important feature of the invention is the means for communication of the inlet 12 and the ventilation hole 3 in the habitation's roof 2. The inlet and the hole may, or may not, register exactly, and it is an advantage of this invention that exact registration is not required.

The means for accomplishing this result is a moldable, flexible membrane (also herein known as a mat) 30. The membrane is affixed to the system's inlet 12 and rests upon the roof 2, where it overlies and/or surrounds, but is not affixed to, either the roof 2 or the ventilation hole 3 in the roof. Notwithstanding the lack of fixation, the membrane 30 forms a substantially airtight seal with the roof 2 by merely lying in place. The membrane, because of its moldability and weight, is capable of conforming to the surface contour of almost any roof to form a substantially airtight seal with the roof. One preferred material for making the membrane 30 is polyurethane.

Both foam and solid rubbers can be used to make the moldable, flexible membrane 30. Other preferred materials for making this membrane 30 include neoprene foam rubber, commonly used as wet suit material, or natural foam rubber, often used for making computer mouse pads. Latex foam rubber and polyurethane foam rubber, both of which are typically used as moldable cushioning materials, may also be used to make the moldable membrane 30. A one-quarter inch thick natural foam rubber sheet measuring eight inches wide and twelve inches long is another preferred embodiment of the membrane 30. This embodiment will fit atop a typical cat litter box enclosure 1. However, due to the variety of different sized animal housings available, foam rubber sheets of different thicknesses, widths and lengths can be employed to make the membrane 30. It is also possible to construct this moldable plastic membrane 30 out of a very thin sheet of solid rubber material. It is critical for this embodiment of the invention that this thin sheet of solid rubber forming the membrane 30 be thin enough so that gravity will pull the thin rubber sheet against the roof 2 of the animal housing 1 to substantially form an air seal. Solid neoprene rubber or solid natural rubber are other preferred embodiments for a membrane 30.

With the exhaust system held in place by means of the membrane, the system operates as follows. The electric fan draws air from inside the animal habitation structure 1 via the ventilation hole 3 in the housing's roof. The air then passes through the air inlet 12, through the fan 20 and filter 15, and then out of the system 10 via outlet apertures 14. The air is exhausted into the ambient atmosphere exterior to the enclosure 1.

Preferably, a manual switch is provided to activate or deactivate the fan 20. This facilitates operation of the fan to keep the habitation fresh. However, there may also be provided, in connection with the system 10, a sensor 40 operably connected to the electric fan 20 for detecting the presence of an animal entering and leaving the habitation, for example to use the litter box. The sensor may be set to activate the electric fan when an animal is present in the habitation or actually using the litter box and deactivate the fan when the animal leaves the site. An infra-red motion detector is one preferred embodiment of the sensor 40. When this infra-red motion detector senses the presence of a moving animal within the habitation 1, the electric fan 20 is activated. One commercially available infra-red motion detector which can be used to make the sensor 40 is the PIR Motion Detector, model no. 80-300, made by DataKit, LKG Industries, Inc. Rockford, Ill. 61109.

Figure 6:
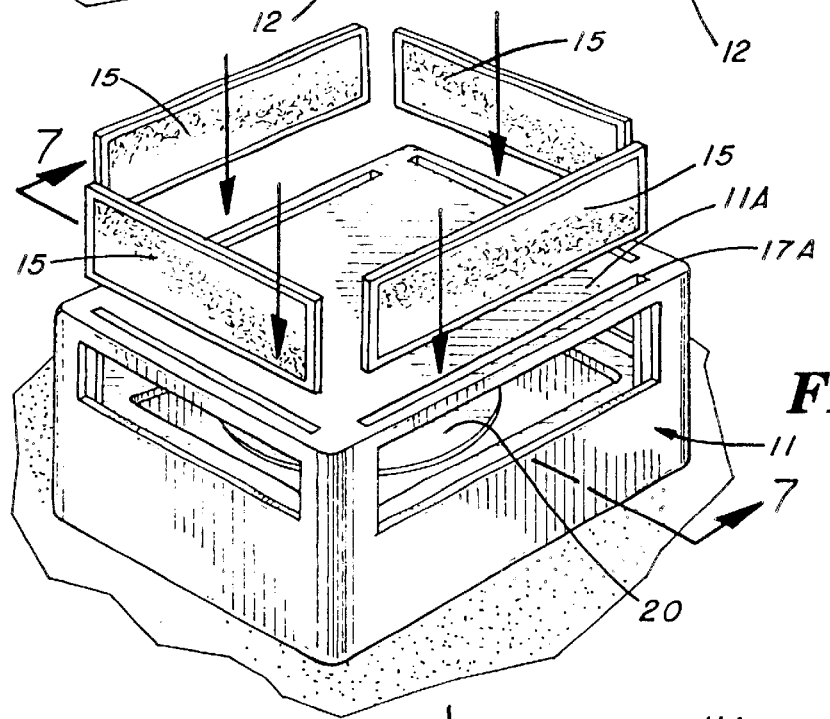
FIG. 6 is an exploded view of an alternative embodiment of the filter and filter retention means.
Figure 7:
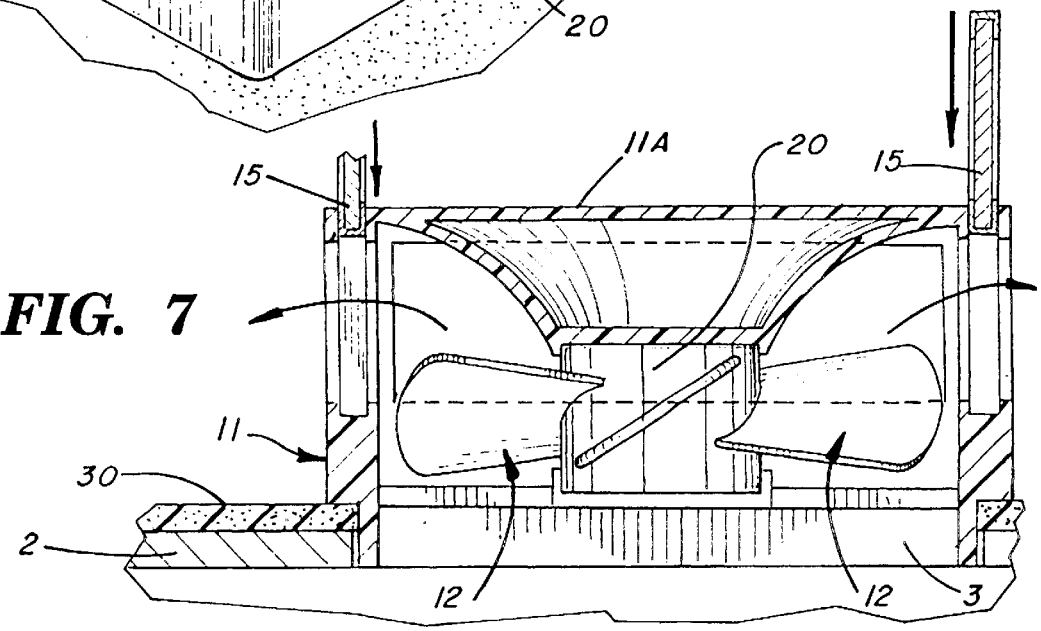
FIG. 7 is a sectioned view of the enclosure of FIG. 6 taken along the line 7—7.

An alternate embodiment of the invention is shown in FIGS. 6 and 7. In this embodiment of the invention, filters 15 are removably received in slots 17A on roof 11A of exhaust unit 11.

Figure 8:
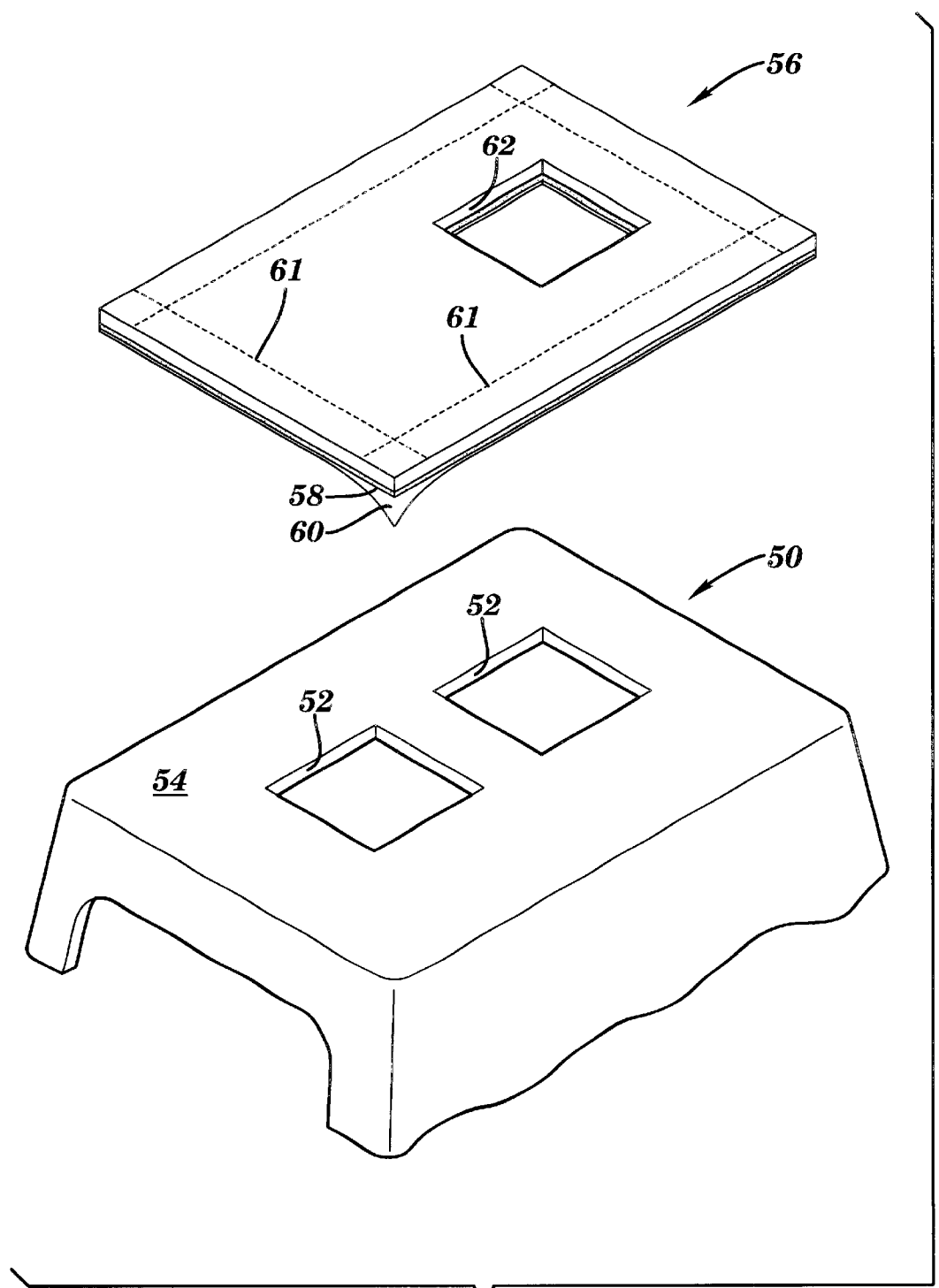
FIG. 8 is a perspective view of a second embodiment of a mat of the invention. This figure shows the mat just prior to its being placed onto an animal housing.
Figure 9:
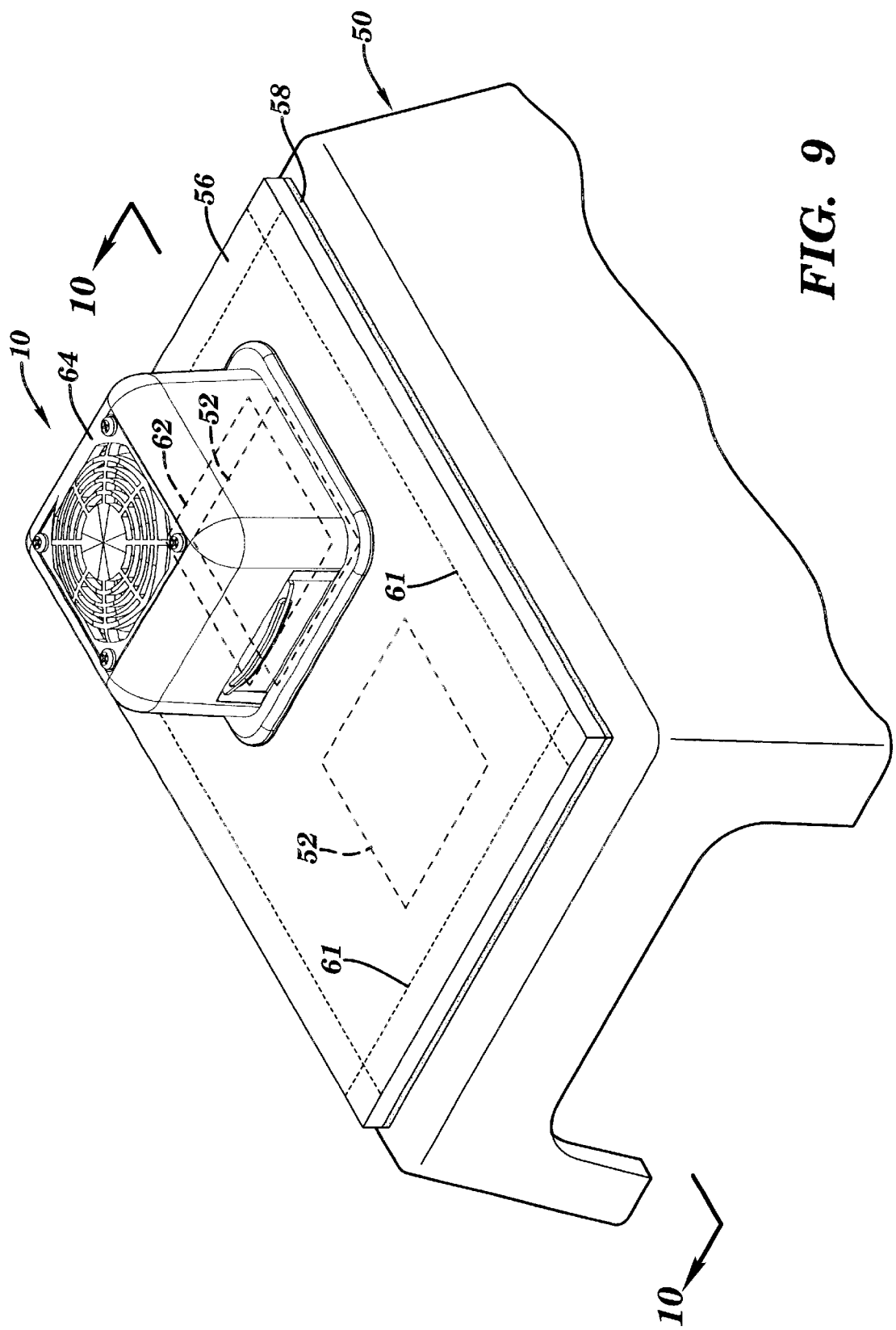
FIG. 9 is a perspective view of the mat shown in FIG. 8 and another embodiment of the exhaust unit of the invention. In this view, the invention is shown mounted on an animal housing.
Figure 10:
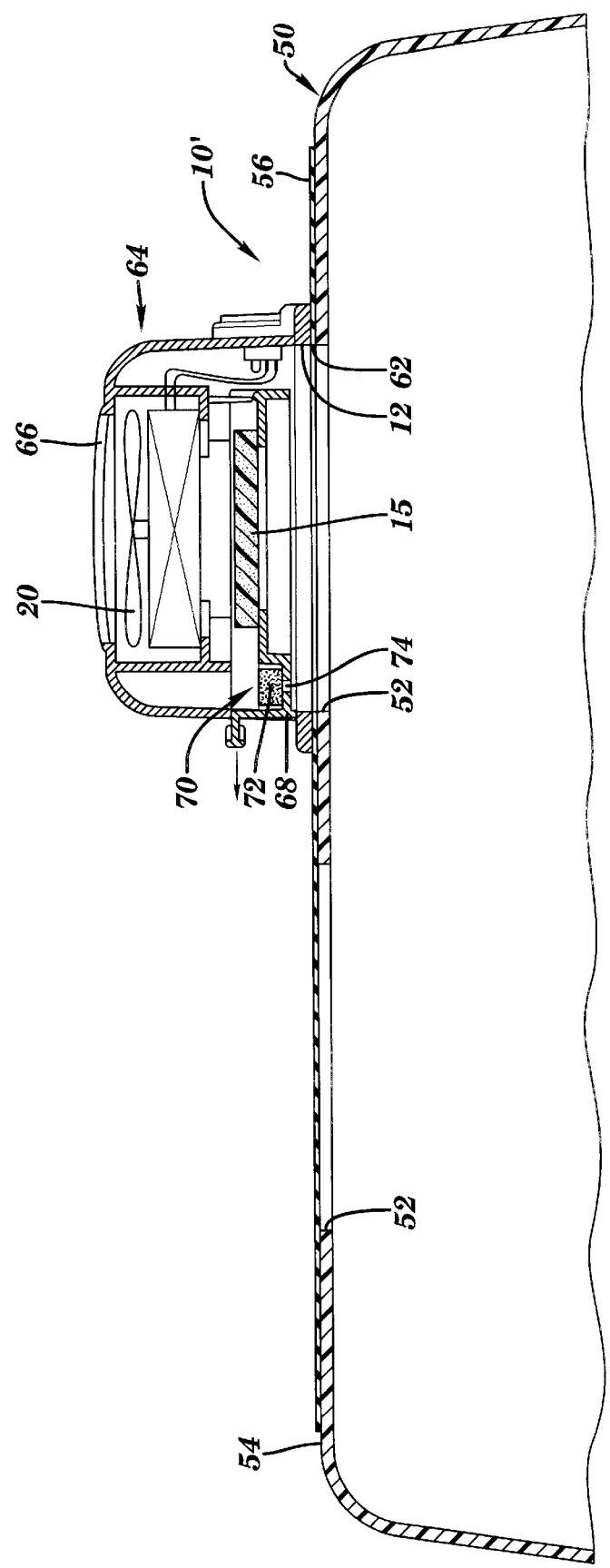
FIG. 10 is a sectional view of the invention shown in FIG. 9, taken at the plane labeled 10—10 in FIG. 9.

FIGS. 8–10 show another embodiment of the invention. In the embodiment shown, the system 10' is being added to an animal habitation 50 in the form of an enclosed litter box for a cat. As can be seen, a plurality of vent holes 52 are located in the habitation's roof 54.

FIG. 8 shows a portion of the system just prior to its placement onto the animal habitation 50. In this embodiment, a mat 56 is used in lieu of the mat 30 of the previous embodiment. The previously noted materials that could be used to fabricate mat 30 may also be employed to fabricate mat 56. A significant difference between the mat 56 and the mat 30 is that mat 56 additionally includes a layer 58 of adhesive located on its bottom surface. The adhesive is preferably of a type that is covered until needed by a thin, removable backing sheet 60. In FIG. 8, the sheet 60 is shown peeled off from one corner of the mat. Typical materials that may be used for sheet 60 include paper or plastic. Alternatively, the adhesive can be of a type that is activated by the use of water or some other solvent/catalyst. Just prior to the mat being applied to the roof of the enclosure, the adhesive is exposed by removal of backing 60 (or activated, if the adhesive is of that type). The backing is discarded and the remaining rubber/plastic portion of the mat is then applied to the roof of the enclosure 50 whereby the adhesive contacts the surface of the roof and functions to secure the mat to the roof. Unlike the first embodiment of the invention, where the airtight seal was facilitated by the weight of the mat, the adhesive will create an airtight seal even if the mat is made of a very thin, light material.

In the preferred embodiment, the mat 56 is a ten-inch by ten-inch square. A different shape or size mat may alternatively be employed. In the preferred embodiment, a number of perforations 61 are pre-cut in the mat to enable one or more portions of the mat to be removed to facilitate a proper fit of the mat to the roof 54. It should be noted that the perforations preferably do not extend completely through the mat.

The mat also includes a precut hole 62. The hole preferably measures about three inches by three inches.

FIGS. 9 and 10 show the complete system 10' in place atop the roof of the habitation 50. When the mat 56 is being placed on the habitation, it is positioned so that the precut hole 62 in the mat is located atop, and at least in partial registration with, one of the vent holes 52 in the habitation's roof. It should be noted that the mat completely surrounds the vent hole, or the portion of the vent hole in registration with hole 62, to enable an airtight seal. In the preferred embodiment, the mat extends from three to eight inches outwardly from hole 62.

As can be seen FIG. 9, the roof's vent hole 52 that underlies the mat but is not in registration with hole 62 has become sealed by the mat. The seal is similar to that achieved when one seals a puncture in a bicycle innertube by the application of an adhesive patch.

Once the mat 56 is in position, the system's exhaust unit 64 (also herein known as a fan housing and/or exhaust system) is placed atop the mat, with the unit's air inlet 12 (note FIG. 10) located atop the mat, with inlet 12 located in at least partial registry with hole 62 in the mat. Alternatively, the exhaust unit's inlet 12 can be sized to fit through hole 62 in the mat. While not shown, another alternative for the contact area between the exhaust unit and the mat is to employ double-stick foam tape on the perimeter of the air inlet 12. The tape will then act to enhance the seal between the exhaust unit and the mat 56 and/or the roof 54, while also providing a mechanism for securing the exhaust unit to either the mat or roof. The mat preferably extends at least approximately one inch outwardly from the perimeter of the inlet 12.

FIG. 10 provides a sectional view of the system 10'. It should be noted that in this embodiment of the invention, the exhaust unit 64 is functionally almost identical to the unit 11 of the first embodiment. One should also note the change in the location and shape of the exhaust unit's outlet aperture 66 (equivalent to apertures 12 of the first embodiment), as well as the use of a filter drawer 68, having a handle 69. The drawer can slide outwardly, as indicated by the arrow in FIG. 10.

Removably located within the drawer 68 is a filter 15. The filter 15 may be a simple filter that simply removes impurities in the air, or it can be a deodorizing filter in which the air passes through a layer of material, such as activated charcoal, that preferably both filters and deodorizes the air. While not shown, the exhaust unit 64 may also include a de-ionizer at least partially located in the air's flow path.

In this embodiment, the filter drawer 68 also includes an area 70 into which a removable, fragrance bar 72 is placed. The bottom of area 70 includes a plurality of ventilation holes 74. When the fan 20 is operating, a portion of the air will be drawn through the filter 15. Another portion of the air will simultaneously be drawn through the ventilation holes 74, where it will contact the fragrance bar 72 before continuing toward the air outlet formed by aperture 66.

The preferred embodiments of the invention disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

We claim:

1. In an animal housing having a roof provided with a ventilation hole, a litter box filter system comprising:
    a) an exhaust system having an inlet and an outlet, and further comprising:
        1. a fan housing;
        2. an electric fan mounted in the fan housing;
        3. an exhaust filter removably received within the fan housing; and
    b) a mat for connecting the exhaust system's inlet to said roof, wherein the mat is fixed to the inlet of the exhaust system and removably rests upon said roof, wherein said mat extends a distance beyond said inlet and covers a portion of said roof, wherein said mat forms substantially an air seal with the roof, whereby responsive to the electric fan, air may freely flow from the ventilation hole, into the inlet, through the exhaust filter and then exit the system via said outlet.

2. A litter box filter system as recited in claim 1, wherein the mat is flexible and is capable of conforming to the roof of the animal housing, wherein said mat includes a hole, wherein when said mat is placed on the roof of the animal housing, said hole in said mat is placed in at least partial registry with the ventilation hole in the roof, and wherein the inlet of the fan housing is in at least partial registry with the hole in said mat.

3. The filter system of claim 2 wherein said mat is made of a plastic material.

4. A method for converting a passively-vented animal housing to an actively-vented animal housing, said method comprising:

placing a flexible mat and an exhaust system atop a passively-vented housing in a manner wherein a hole in said mat is placed in at least partial registration with a roof-located ventilation hole of said housing, wherein said exhaust system includes an electrically-powered fan, an air inlet leading to said fan, and an air outlet for air expelled by said fan, wherein said air inlet is in at least partial registration with the hole in the mat, and wherein at least a portion of said mat extends outwardly a distance from said air inlet; and providing an electric current to said fan whereby said fan will draw air from said housing via said air inlet and then exhaust said air via said air outlet.

5. The method of claim 4 wherein when a user places the mat onto the roof of the animal housing, if there are roof-located ventilation holes that underlie said mat and that are not in at least partial registration with said hole in said mat, said mat will seal said roof-located holes.

6. The method of claim 4 wherein prior to placement of the mat onto the roof of the animal housing, a backing is removed from a bottom surface of said mat to thereby expose an adhesive layer of said mat, whereby when the user places the mat onto the roof of the housing, the adhesive layer will secure the mat to said housing.

7. The method of claim 4 wherein said exhaust system includes a filter, and wherein operation of said fan causes air from said housing to pass through said filter.

8. An exhaust system kit for an animal housing, said kit comprising:

an exhaust unit having an air inlet, an air outlet, and an electrically-powered fan in communication with said air inlet and said air outlet;

a mat that features an adhesive layer capable of securing the mat to a roof portion of an animal housing, wherein said mat has a hole and is sized wherein when said exhaust system is located atop said mat, said mat will extend outwardly of the said air inlet; and wherein when said kit is placed onto a roof portion of an existing animal housing that features a roof-located ventilation hole, the mat's hole is placed in at least partial registration with said ventilation hole, and wherein placement of said mat onto the animal housing will create an airtight seal around said ventilation hole.

9. The kit of claim 8 wherein said exhaust unit includes a removable filter located in an air flow path extending between said air inlet and said air outlet.

10. The kit of claim 9 wherein said filter comprises a layer of activated charcoal.

11. The kit of claim 8 further comprising a removable fragrance bar located in said exhaust unit in a manner whereby when air is flowing from said air inlet to said air outlet, at least a portion of said air will contact said fragrance bar.

12. The kit of claim 8 wherein the adhesive layer of said mat is covered by a removable backing that is removed prior to the mat being placed onto an animal housing.

13. The kit of claim 8 wherein the air inlet has a cross-sectional area that is greater than a cross-sectional area of the hole in the mat.

14. The kit of claim 8 wherein the mat includes a plurality of perforations, wherein if the mat is sized whereby a portion of said mat will not overlie the roof of the housing onto which the mat is being placed, said perforations facilitate removal of said portion of said mat.

15. The kit of claim 8 wherein the mat has a surface area of at least thirty square inches.

16. The kit of claim 8 wherein the mat is made of a flexible material.

* * * * *